United States Patent [19]

Morita

[11] Patent Number: 5,005,987
[45] Date of Patent: Apr. 9, 1991

[54] RECTILINEAR MOTION ROLLING GUIDE UNIT

[75] Inventor: Kunihiko Morita, Koganei, Japan

[73] Assignee: Nippon Thompson Co., Ltd., Tokyo, Japan

[21] Appl. No.: 570,596

[22] Filed: Sep. 11, 1990

Related U.S. Application Data

[63] Continuation of Ser. No. 379,259, Jul. 13, 1989.

[30] Foreign Application Priority Data

Dec. 1, 1988 [JP] Japan .................... 63-302239

[51] Int. Cl.[5] ............... F16C 29/06; F16C 19/49
[52] U.S. Cl. ............................. 384/43; 384/45; 384/48
[58] Field of Search .................. 384/43–45, 384/48; 464/168

[56] References Cited

U.S. PATENT DOCUMENTS

| | | | |
|---|---|---|---|
| 1,898,273 | 2/1933 | Stevens | 384/48 |
| 4,428,627 | 1/1984 | Teramachi | 384/45 |
| 4,558,910 | 12/1985 | Teramachi | 384/44 |
| 4,692,037 | 9/1987 | Kasai | 384/45 X |

FOREIGN PATENT DOCUMENTS

| | | | |
|---|---|---|---|
| 1107085 | 12/1955 | France | 384/44 |
| 623665 | 8/1961 | Italy | 384/48 |
| 181431 | 10/1982 | Japan . | |
| 33821 | 3/1983 | Japan . | |
| 46666 | 10/1986 | Japan . | |

Primary Examiner—Thomas R. Hannon
Attorney, Agent, or Firm—Rogers & Killeen

[57] ABSTRACT

There is provided a rectilinear motion rolling guide unit comprising: a long track rail having an almost I-shaped cross section; a casing having an almost inverse U-shaped cross section; and rolling elements interposed between the track rail and the casing. The casing is arranged so as to ride over the track rail by a concave portion formed in the central lower portion of the casing. Upper and lower corner portions of both upper projecting portions of the track rail are chamfered to form inclined surfaces, thereby forming two upper and lower rail side track surfaces, respectively. Two upper and lower casing side track surfaces are formed on the inner peripheral surfaces of the concave portion of the casing at positions corresponding to the two upper and lower rail side track surfaces. A number of rolling elements are interposed between the corresponding track surfaces on the rail and casing sides, respectively, thereby allowing a relative slidable motion between the track rail and the casing. Rolling elements return passageways are formed in the casing in correspondence to the two upper and lower casing side track surfaces. Two upper and lower direction turning passageways for the rolling elements which roll and run on the two upper and lower casing side track surfaces are formed in each of side plates. The side plates are attached to both end portions in the longitudinal direction of the casing, thereby coupling the two upper and lower casing side track surfaces with the corresponding return passages. Thus, two upper and lower endless rolling elements circulating passageways are formed.

4 Claims, 8 Drawing Sheets

RECTILINEAR MOTION ROLLING GUIDE UNIT

This is a continuation of application Ser. No. 379,259, filed July 13, 1989.

BACKGROUND OF THE INVENTION

1. Field of the Invention

The present invention relates to a rectilinear motion rolling guide unit in which rollers or balls are used as rolling elements for a linear motion rolling guide unit, and both of a track rail and a slide unit which rides over the track rail are rectilinearly guided and moved by the rolling friction.

2. Description of Related Background Art

Conventional similar guide units have been disclosed in Japanese Patent Application No. 57-181431 (Japanese Patent Application Laid-Open No. 59-73623), Japanese Utility Model Application No. 56-128133 (Japanese Utility Model Application Laid-Open No. 58-33821), and Japanese Patent Application No. 61-46666 (U.S. Pat. No. 4,692,037), respectively.

In the invention of Japanese Patent Application No. 57-181431, particularly, in FIG. 5, there is shown a rectilinear motion rolling guide unit having four tracks of the parallel type in which four corners of a block having a rectangular cross section are chamfered and the chamfered portions are used as track surfaces of rollers (the type in which the rollers are arranged so that the axial centers of the rollers in the load track surfaces are parallel). According to such a type of guide unit, although the load capacities are equal for the loads in the vertical direction, in most of the cases, the downward load is larger than the upward load in the actual use, so that such a structure does not satisfy the practical use condition with respect to the load capacities.

In the invention of Japanese Utility Model Application No. 56-128133, particularly, in FIG. 6, there is shown a guide unit in which a drawback of the high costs which is caused when all of the rolling elements on four tracks use rollers is improved and the upward load is applied by using cheap balls. However, since the track members for the rollers and balls are formed separately from the casing, when they are assembled as a unit, there are drawbacks such that accumulation assembly errors are easily caused and the rectilinear motion rolling accuracy is low. On the other hand, since the number of parts increases, the costs also rise and such a structure is undesirable. Further, according to such a type of guide unit, since the upper surface of the track rail is used as a track surface for the rollers and the endless circulating passageway in the loadless region is also formed at a top position, a cross sectional height of the slide unit is also large.

In the invention of Japanese Patent Application No. 61-46666, the cross sectional height of the whole unit is further lowered than that in Japanese Patent Application No. 57-181431, the axial centers of the rollers are gradually twisted in the loadless circulating passageway near the track surface until the axial centers are set to be vertical, the rollers are smoothly moved on the other endless circulating passageways, and no circulating passageway is formed in the height direction of the unit. However, even in such an invention, there is a drawback such that the unit is expensive because rollers are used as the rolling elements on all of the four tracks.

SUMMARY OF THE INVENTION

It is an object of the present invention to solve the drawbacks in the conventional techniques mentioned above and to provide a small rectilinear motion rolling guide unit which is suitable for a practical use and in which a good load characteristic and a high rectilinear motion rolling accuracy are obtained and the manufacturing costs are low.

According to one aspect of the present invention, the above object is accomplished by a rectilinear motion rolling guide unit comprising: a long track rail having an almost I-shaped cross section; a casing having an almost inverse U-shaped cross section; and rolling elements which are interposed between the track rail and the casing, wherein the casing is arranged so as to ride over the track rail by a concave portion having an almost inverse U-shaped cross section which is formed in the central lower portion of the casing, upper and lower corner portions of both upper projecting portions of the track rail are chamfered to form inclined surfaces, thereby forming two upper and lower rail side track surfaces, respectively, two upper and lower casing side track surfaces are formed on the inner peripheral surfaces of the concave portion of the casing at positions corresponding to the two upper and lower rail side track surfaces, a number of rolling elements are interposed between the corresponding track surfaces on the rail and casing sides, respectively, thereby allowing a relative slidable motion between the track rail and the casing which rides over the track rail, rolling elements return passageways are formed in the casing in correspondence to the two upper and lower casing side track surfaces, respectively, two upper and lower direction turning passageways for the rolling elements which roll and run on the two upper and lower casing side track surfaces are formed in each of side plates, the side plates are attached to both end portions in the longitudinal direction of the casing, respectively, and thereby coupling the two upper and lower casing side track surfaces with the corresponding return passages, respectively, and thereby forming two upper and lower endless rolling elements circulating passageways.

According to another aspect of the invention, in the guide unit, rollers and balls are used as the rolling elements as a combination for rolling element tracks between the track surfaces on the rail and casing sides.

According to further another aspect of the invention, in the guide unit, as the rolling elements which roll on the two upper and lower endless rolling elements circulating passageways, rollers which are arranged in parallel are used for the upper circulating passageway, and balls are used for the lower circulating passageway.

According to further another aspect of the invention, in the guide unit, in the upper endless rolling elements circulating passageway between the two upper and lower endless rolling elements circulating passageways, a shape in a transition region between the casing side roller track surface and the direction turning passageway which is adjacent to and continued with the track surface is formed in a manner such that angles of axial centers of the rollers which roll in the transition region gradually change for a horizontal surface of the casing, thereby constructing an upper endless circulating twisted passageway.

According to further another aspect of the invention, in the guide unit, in the upper and lower direction turning passageways, concave grooves which extend like almost semicircles in the side plates on the extension lines of the casing side track surfaces are formed, and spacers are fitted into the concave grooves to thereby form the direction turning passageways for allowing the rollers to smoothly pass.

By constructing the guide unit of the present invention as mentioned above, the height of slide unit can be set to be low, the downward load is applied by the rollers, and the opposite upward load can be applied by the balls. Therefore, the guide unit of the invention can make the most of the characteristic of the rollers, and even if a heavy load is applied to the slide unit from the upper position, the rollers can smoothly lightly move.

The above and other objects and features of the present invention will become apparent from the following detailed description and the appended claims with reference to the accompanying drawings.

DETAILED DESCRIPTION OF THE PREFERRED EMBODIMENTS

Figure 1:
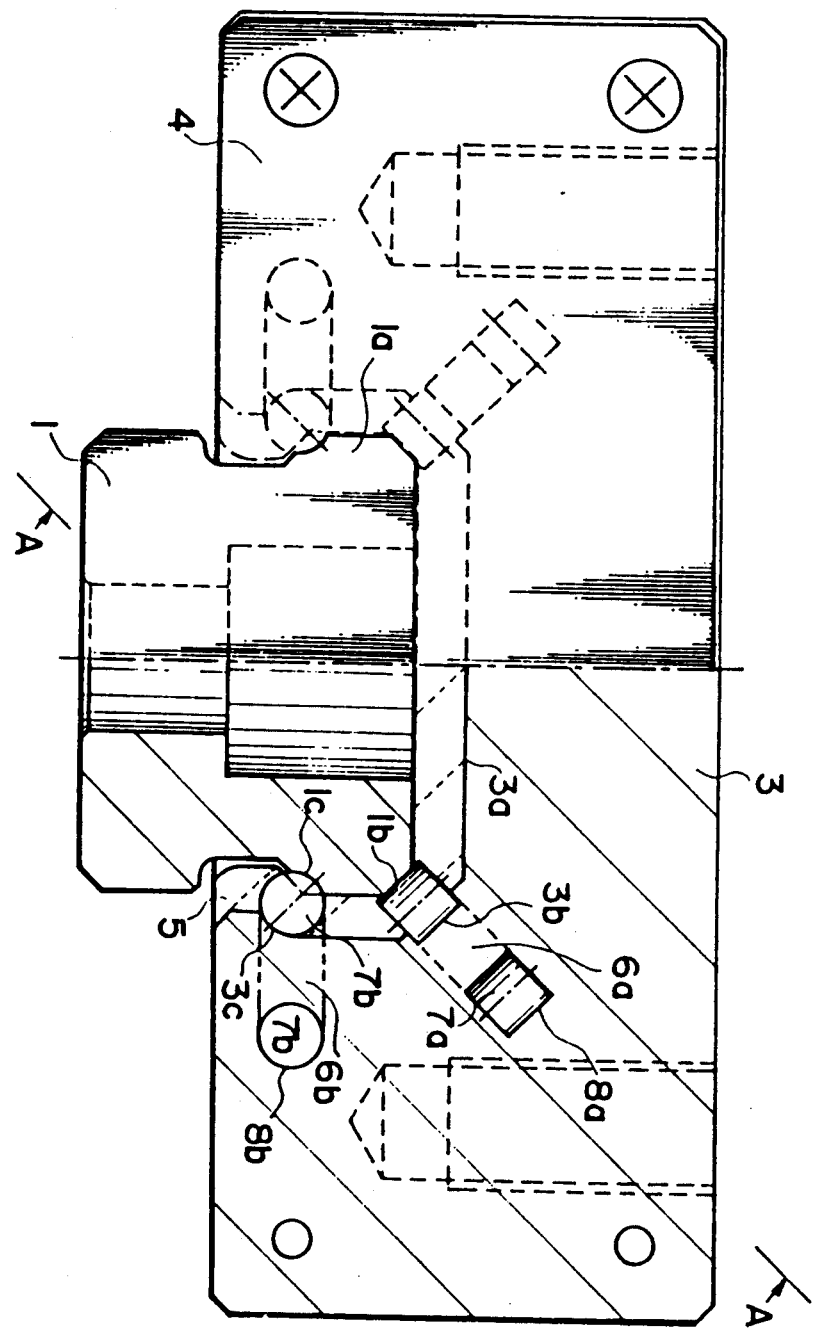
FIG. 1 is a front view of the first embodiment of the present invention.

FIG. 1 shows a front view of the first embodiment of the present invention. A rectilinear motion rolling guide unit shown in FIG. 1 comprises: a long track rail 1 having an almost I-shaped cross section; a casing 3 having an almost inverse U-shaped cross section; and a number of rollers 7a and balls 7b serving as rolling elements 7 which are interposed between the track rail 1 and the casing 3.

The casing 3 has an inverse U-shaped cross section. A concave portion or groove 3a is formed in the central lower portion of the casing 3 so as to open downwardly the central lower portion of the casing 3. The concave portion 3a has cross sectional dimensions enough to enclose the upper portion of the track rail 1. Thus, the casing 3 rides over the track rail 1 fitted into the concave portion 3a so as to be slidable in the longitudinal direction through a number of rolling elements.

In a preferred embodiment of the invention, the track rail 1 has an I-shaped cross section and each of the upper and lower corner portions of upper right and left projecting portions 1a is chamfered so as to obtain an inclined surface. Practically speaking, each of the upper corner portions is chamfered so as to obtain an inclined flat surface 1b for the roller rolling elements. Each of the lower corner portions is chamfered so as to obtain a curved concave surface 1c for the ball rolling elements. In this manner, the track surfaces 1b and 1c on the track rail side are formed. On the other hand, two upper and lower track surfaces 3b and 3c on the casing side having symmetrical cross sectional shapes are formed in each of the right and left inner peripheral surfaces of the concave portion 3a of the casing 3 at positions so as to face the two upper and lower track surfaces 1b and 1c on the track rail side, respectively. A number of rollers 7a are interposed between the upper track surfaces 1b and 3b of the track rail 1 and casing 3 which face each other. A number of balls 7b are interposed between the lower track surfaces 1c and 3c of the track rail 1 and casing 3 which face each other. Thus, a load linear motion rolling guide unit is constructed by those track surfaces, respectively.

With such a construction, the guide unit of the invention has a withstanding property for a large downward load.

Figure 2:
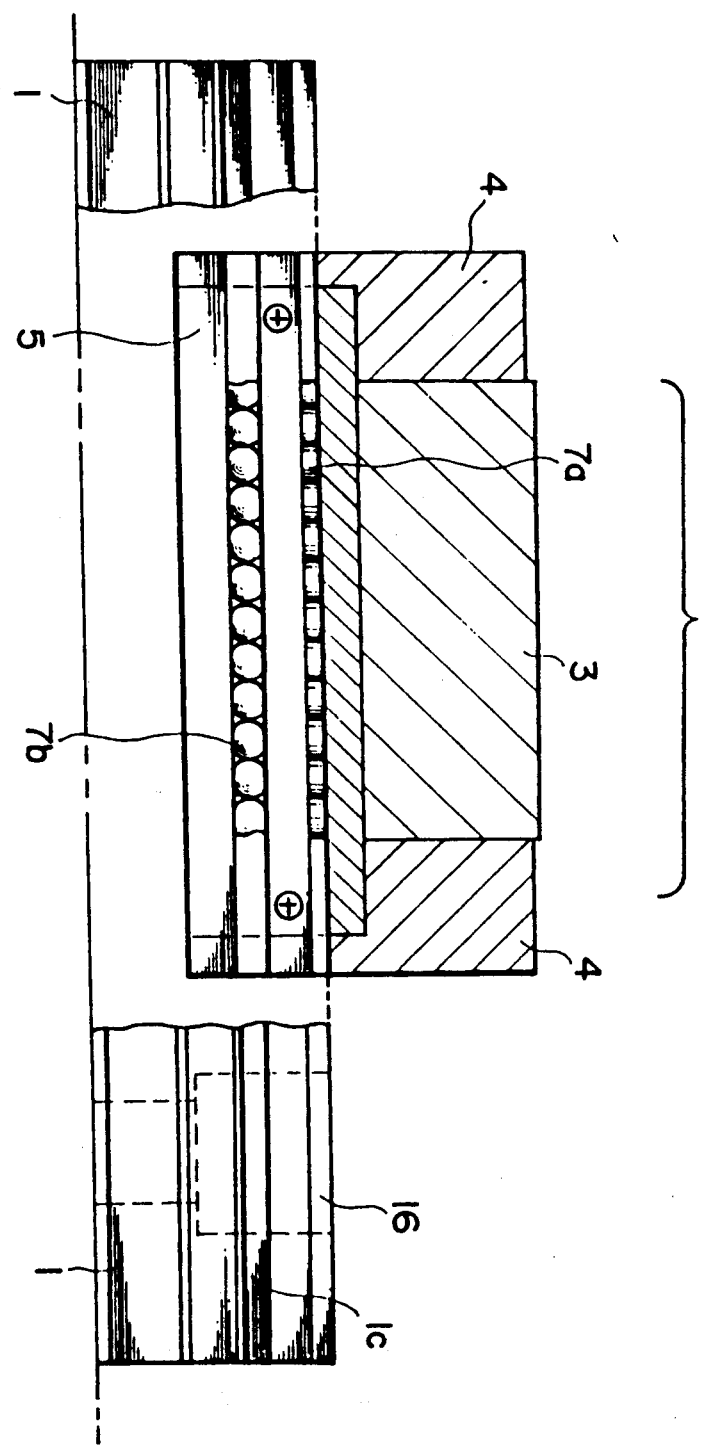
FIG. 2 is a side elevational view of the first embodiment shown in FIG. 1.
Figure 3:
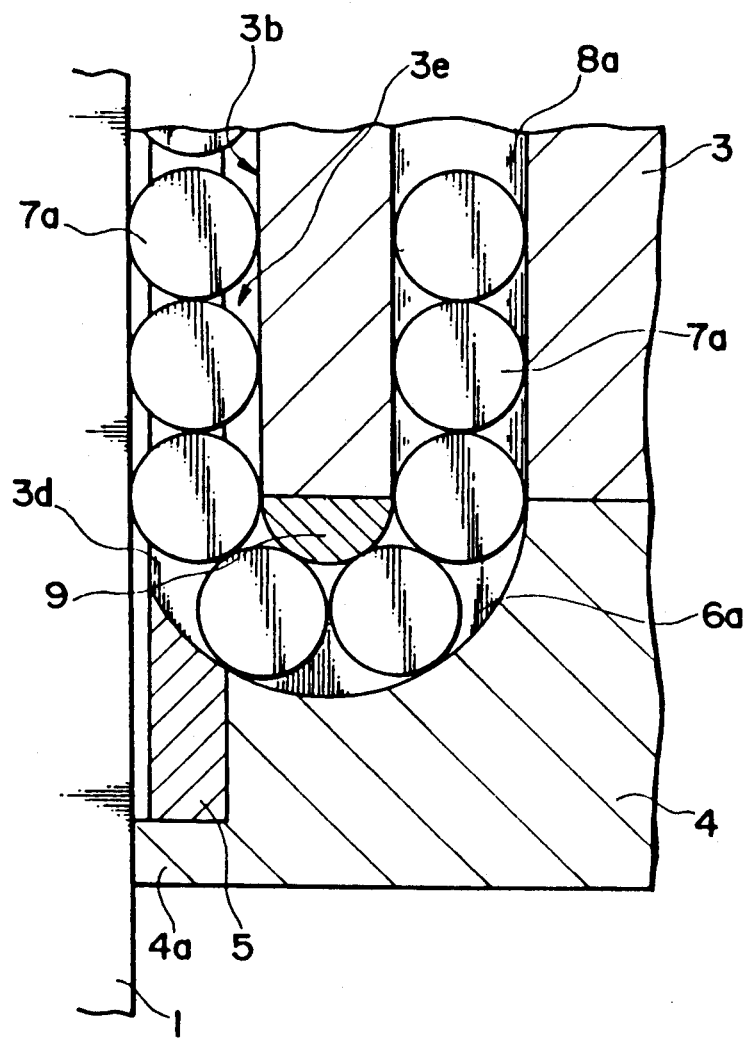
FIG. 3 is a cross sectional view taken along the line A—A in FIG. 1.
Figure 5:
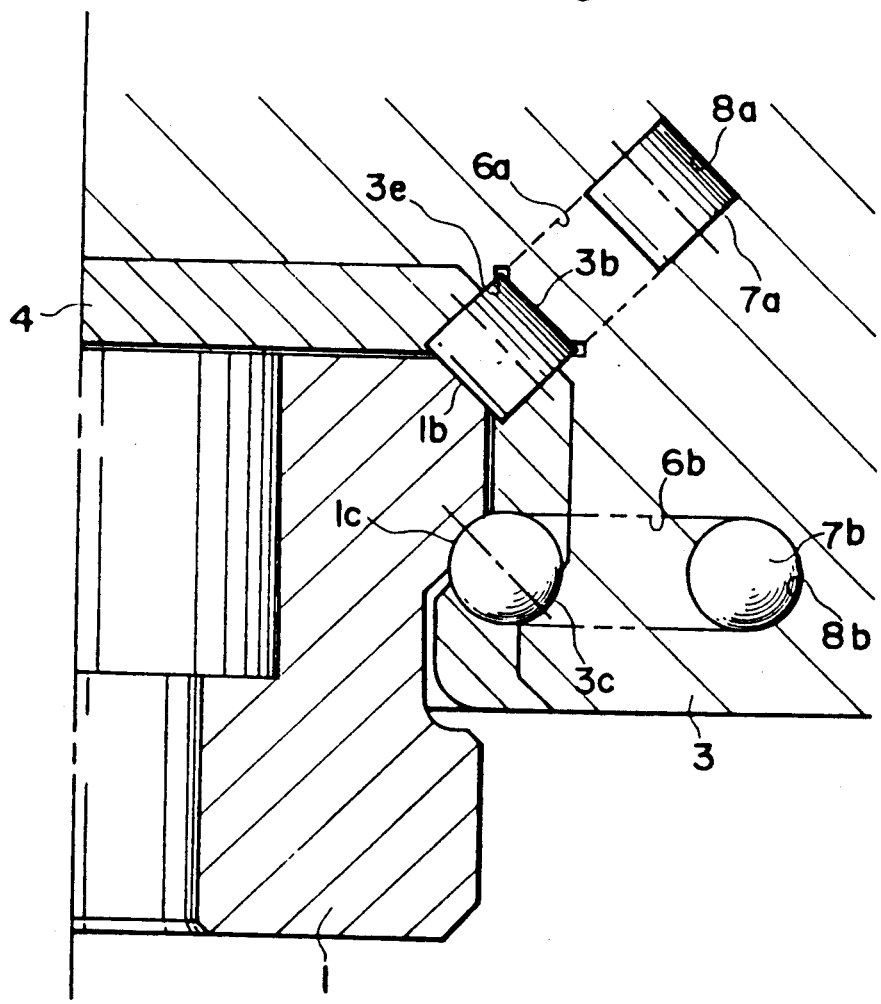
FIG. 5 is an enlarged diagram showing a part of the embodiment of FIG. 1.

As shown in FIGS. 2 and 5, the rollers 7a and balls 7b are held onto the casing side track surfaces 3b and 3c by holding plates 5, respectively. A slit 5a is formed in the portion where each of the holding plates 5 is come into contact with the rolling elements 7 (rollers 7a and balls 7b) on the track surfaces, thereby providing a casing side track window 3d as shown in FIG. 3. A part of the rolling elements 7 is projected from the track window 3d and rolls on the rail side track surfaces 1b and 1c. A width of track window is set to be shorter than a diameter of ball or a length of roller, thereby preventing that the rolling elements drop out from the casing side track surfaces 3b and 3c when the casing is removed from the track rail.

In addition to the holding plate 5 with the slit attached to the track surface, side plates 4 (refer to FIG. 4) are attached to both ends in the direction of a vertical axis of the casing 3, thereby constructing a slide unit 2. Return passageways 8 (8a and 8b) of the two upper and lower track surfaces 3b and 3c on the casing side are provided in the casing 3, respectively. On the other hand, two upper and lower direction turning passageways 6 (6a and 6b) are formed in the side plates 4 in correspondence to the return passageways 8 (8a and 8b), respectively. When the side plates 4 are attached to the both end portions of the casing 3, the two upper and lower track surfaces 3b and 3c on the casing side are connected with the two upper and lower return passageways 8 (8a and 8b) corresponding thereto by the two upper and lower direction turning passageways 6 (6a and 6b) in the side plate 4, respectively, thereby forming two upper and lower endless rolling elements circulating passageways in the casing.

FIG. 3 shows a cross sectional view taken along the line A—A in FIG. 1 and illustrates the upper roller endless circulating passageway formed in the slide unit 2 according to the invention. The rollers 7a in the load region existing on the track surface 3b on the casing side are smoothly rolled and guided without causing a skew by a guide surface 3e formed in the width direction of the upper track surface 3b of the casing 3. The roller 7a which has reached the edge surface of the window slit 3d of the holding plate 5 is scooped by the holding plate 5 and is led to the upper direction turning passageway 6a in the side plate 4. Further, the roller 7a is smoothly moved from the direction turning passageway 6a of the side plate 4 to the upper return passage 8a of the casing 3.

Figure 4:
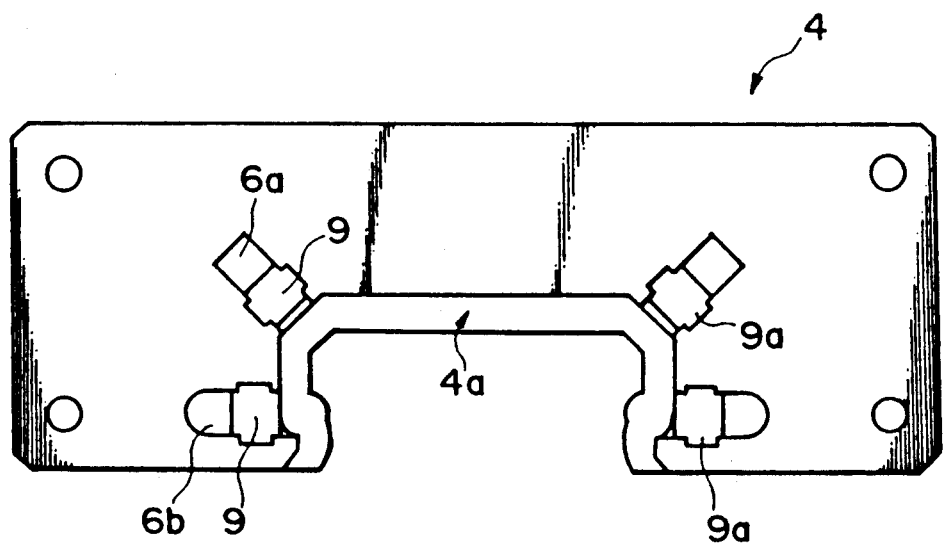
FIG. 4 is a front view of a side plate in the first embodiment.

FIG. 4 shows an inside front view of the side plate 4. The upper and lower direction turning passageways 6a and 6b to couple the two upper and lower casing side track surfaces 3b and 3c with the upper and lower return passageways 8a and 8b are formed in the side plate 4, respectively. The upper and lower direction turning passageways 6a and 6b are formed with concave grooves which are extended like almost semicircles in the side plates 4 on the extension lines of the track surfaces 3b and 3c on the casing side. Spacers 9 to form the direction turning passageways 6 (6a and 6b) are fitted into the concave grooves, thereby forming the direction turning passageways 6 (6a and 6b) for allowing the rolling elements to smoothly pass. A projecting portion 9a for positioning with the concave groove of the side plate 4 is formed on the spacer 9.

Figure 6:
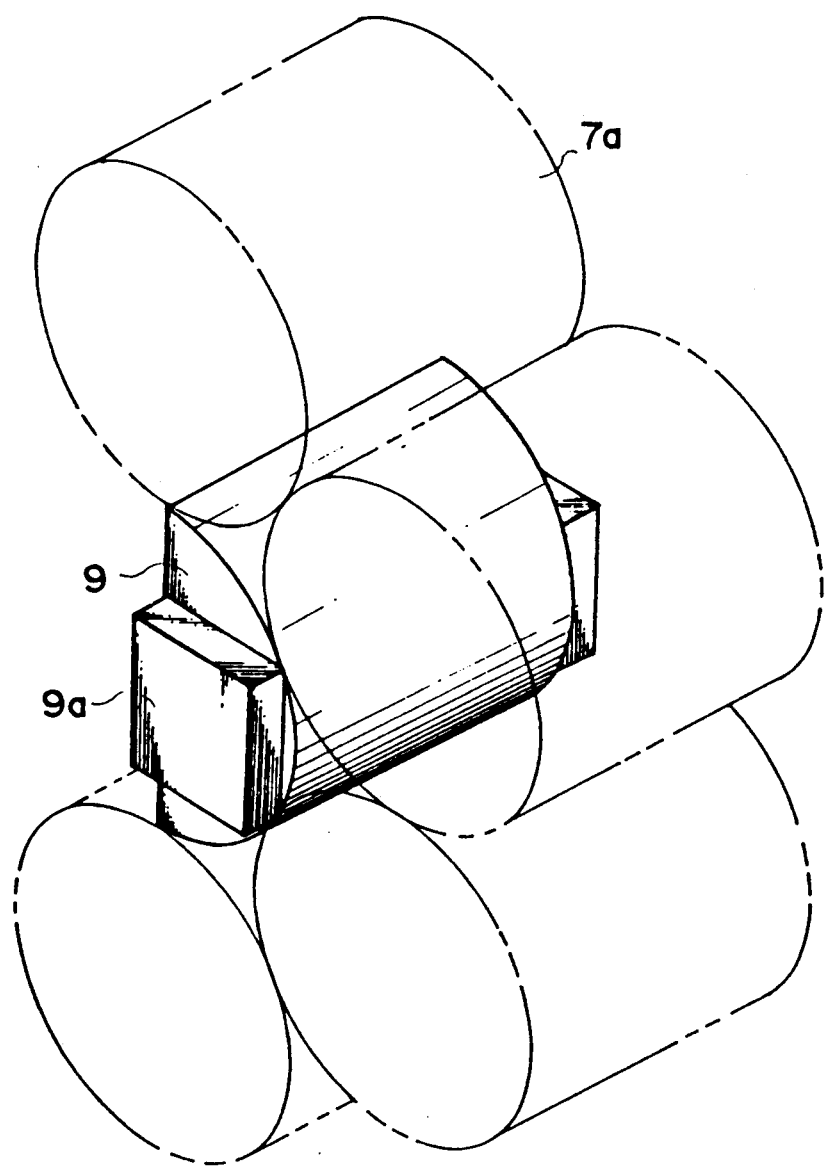
FIG. 6 is a perspective view of a spacer which forms an inner wall surface of a direction turning passageway which is provided in the side plate.

FIG. 6 is a perspective view showing the positional relation between the rollers 7a in the upper direction turning passageway 6a and the spacer 9. The spacer 9 is inserted and positioned into the semicircular concave groove of the side plate 4 so as to form a space between the rollers 7a and the spacer 9, thereby forming the inner wall surface of the direction turning passageway 6. On the other hand, the concave groove itself formed on the side plate 4 forms the outer wall surface of the direction turning passageway. Consequently, the spaces formed by the inner and outer wall surfaces function as the direction turning passageways 6a, thereby allowing the rollers to smoothly roll.

FIG. 6 shows a state in which the rollers move in the direction turning passageway 6a along the outer peripheral surface of the spacer 9.

The side plates 4 and spacers 9 can be easily made of a synthetic resin. The rolling elements holding plate 5 is mainly made of metal; however, it may be also made of an abrasion resistance synthetic resin.

FIG. 5 shows a cross sectional view of the right half body of the guide unit in the first embodiment of the invention. The diagram illustrates the relative positions in the side plates 4 of the upper and lower direction turning passageways 6a and 6b and in the casing 3 of the upper and lower casing side track surfaces 3b and 3c and upper and lower return passageways 8a and 8b, respectively.

Figure 7:
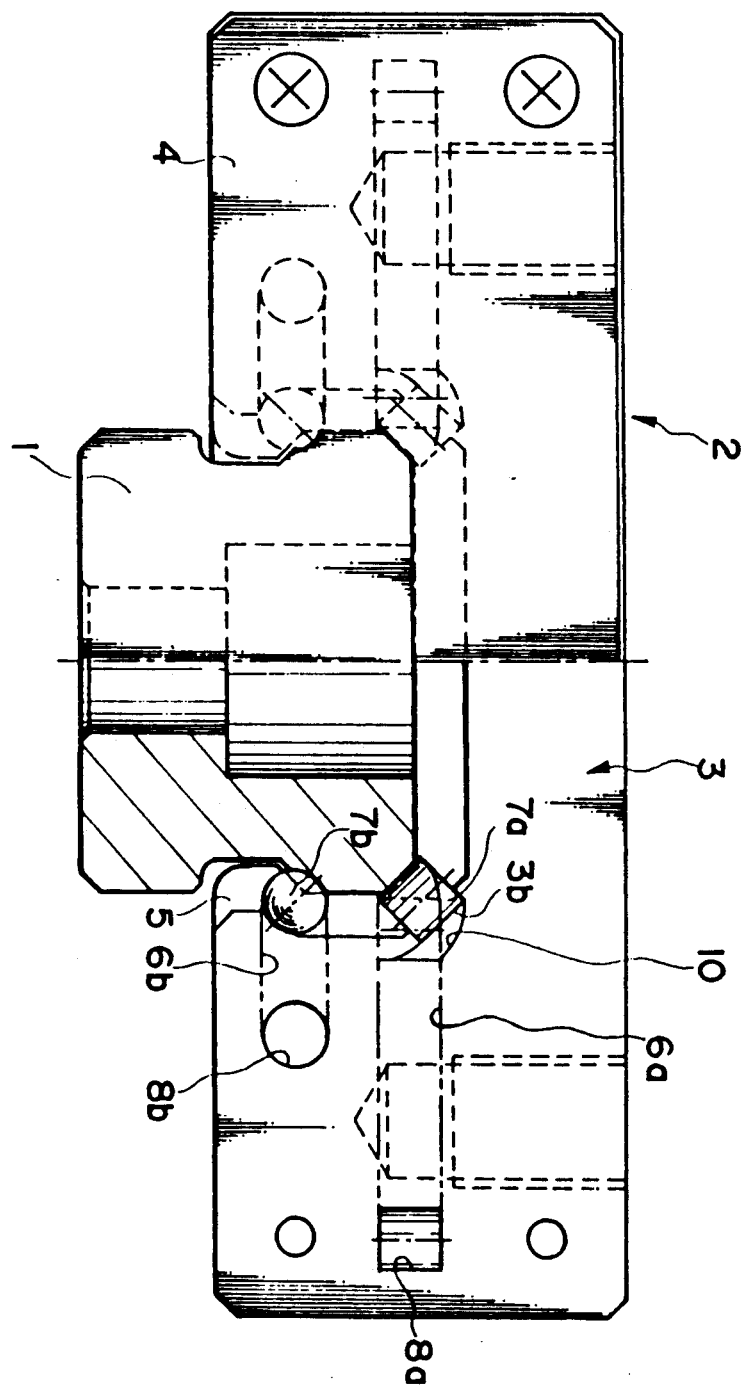
FIG. 7 is a front view of the second embodiment of the invention.
Figure 8:
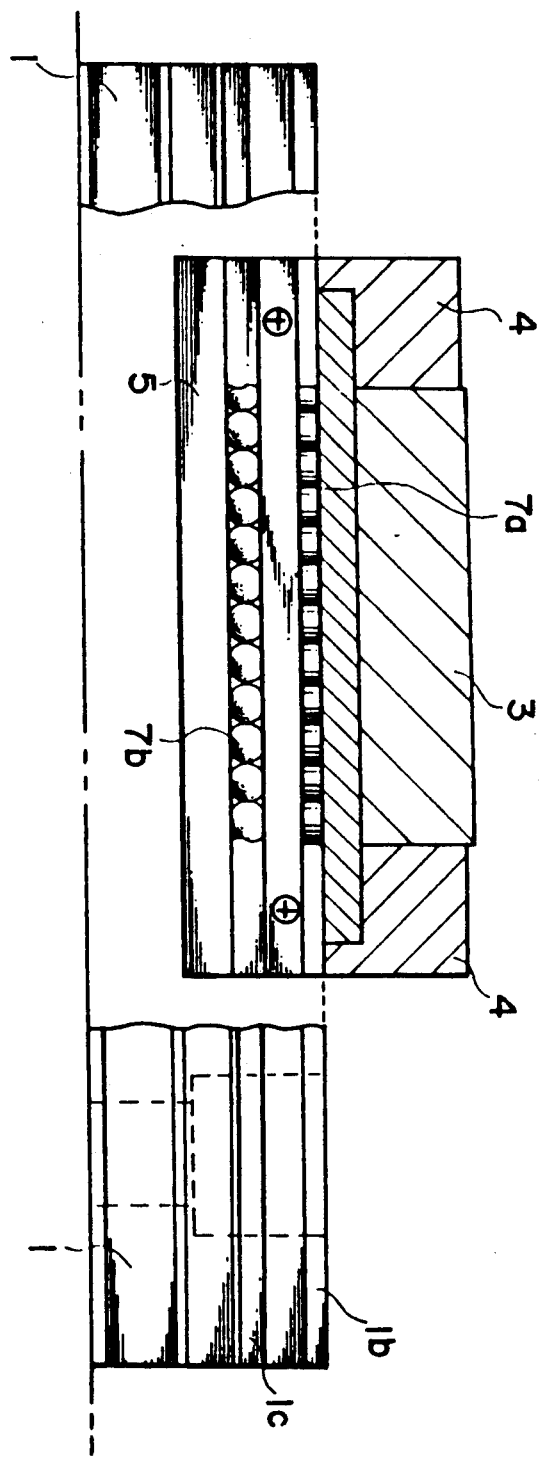
FIG. 8 is a side elevational view of the second embodiment shown in FIG. 7.

FIGS. 7 and 8 show a front view and a side elevational view of the second embodiment of the invention. The guide unit in the second embodiment is constructed in a manner such that the upper roller track surface 1b on the rail side occupies the highest vertical position with respect to the upper endless circulating passageway which is formed in the casing 3. Therefore, a twisted passageway 10 is formed by twisting the shape in the transition region between the upper track surface 3b on the casing side and the upper direction turning passageway 6a which is adjacent to and continued with the track surface 3b. Thus, the angles of the axial centers of the rollers which roll in the twisted region gradually change for the horizontal surface in the casing 3. The roller circulating passageway from the upper roller track surface 3b on the casing side to the loadless region including the upper direction turning passageway 6a and upper return passageway 8a which continue with the track surface 3b is formed on the horizontal surface in the casing 3. Therefore, as compared with the structure in the first embodiment, the height of casing 3 can be fairly reduced and there is also no need to provide a return passageway in the beam portion of the casing 3, so that the mechanical strength of the casing can be enhanced.

The second embodiment has substantially the same construction as the first embodiment except the shape of the upper endless circulating passageway. Thus, the same operations and effects as those in the first embodiment are accomplished.

The following effects are obtained by the rectilinear motion rolling guide units according to the present invention.

(1) As compared with the conventional guide units, the guide unit can be miniaturized and its application range is widened.

(2) As compared with the track member separating type, the rigidity of the casing is fairly increased.

(3) As compared with the size of casing, a larger downward load can be applied to the guide unit (an elastic displacement amount of the roller=½ to ⅓ of that of the ball).

(4) Among the total four right and left rolling elements track surfaces, two track surfaces are used for the balls instead of the rollers, so that the costs can be reduced.

(5) As compared with the type in which the rollers are used for all of the four tracks, the frictional resistance can be reduced.

(6) Since the angular contacting type balls are used, even if there is a variation in rectilinear motion rolling accuracy of the rollers on the two upper tracks, such a variation can be adjusted and absorbed on the ball side.

(7) A desired combination can be realized without losing the characteristics of the rollers and balls, respectively.

(8) When a diameter of roller and a diameter of ball are set to be almost equal, the common parts can be used and the like, so that it is advantageous.

(9) By providing the twisted passageway for the upper endless circulating passageway, the endless circulating passageway is extended to the horizontal surface of the casing or the surface near it, thereby minimizing the height of casing. The mechanical strength of the casing can be enlarged.

Although the present invention has been described and shown with respect to the preferred embodiments, the invention is not limited to the foregoing embodiments but many modifications and variations are possible within the spirit and scope of the appended claims of the invention.

What is claimed is:

1. A rectilinear motion rolling guide unit comprising:
a rail having a top part with projecting side portions, the upper and lower corners of said side portions being chamfered to form inclined upper and lower rail track surfaces;
an inverted U-shaped casing having a concave portion for riding on said rail, said concave portion having upper and lower casing track surfaces corresponding to said upper and lower rail track surfaces;
plural rollers carried between said upper rail and casing track surfaces for resisting a first force tending to decrease the distance between said top part and said concave portion and for holding said rail approximately centered in said concave portion; and
plural balls carried between said lower rail and casing track surfaces for resisting a second force having a component opposite to said first force and for holding said rail approximately centered in said concave portion, said casing having two first cavities for carrying said plural rollers and two second cavities for carrying said plural balls, each of said first cavities having an axis that is aligned approximately forty-five degrees to said top part's upper surface when viewed in vertical cross section and each of said second cavities having an axis that is aligned approximately parallel to said top part's upper surface when viewed in vertical cross section.

2. The guide unit as defined in claim 1 wherein said casing further comprises a holding plate affixed to said concave portion, said plate having slits smaller than said rollers and said balls for holding said rollers and said balls while allowing said rollers and said balls to contact said upper and lower rail track surfaces.

3. A rectilinear motion rolling guide unit comprising:
a track rail (1) having two upper projecting portions;
a casing (3) having an almost inverse U-shaped cross section; and
rolling elements (7a and 7b) which are interposed between said track rail and said casing, said casing (3) being arranged so as to ride over said track rail (1) by a concave portion (3a) having an almost inverse U-shaped cross section which is formed in the central lower portions of the casing.

upper and lower corner portions of both upper projecting portions (1a) of the track rail (1) being chamfered to form inclined surfaces, thereby forming two upper and lower rail side track surfaces (1b and 1c), respectively, two upper and lower casing side track surfaces (3b and 3c) being formed on the inner peripheral surfaces of said concave portion (3a) of the casing (3) at positions corresponding to said two upper and lower rail side track surfaces (1b and 1c), a number of rolling elements (7a and 7b) being interposed between the corresponding track surfaces (1b and 3b; 1c and 3c) on the rail and casing sides, respectively, thereby allowing a relative slidable motion between the track rail (1) and the casing (3) which rides over the track rail, said rolling elements interposed between said upper rail and casing side track surfaces being rollers and between said lower rail and casing side track surfaces being balls, a holding plate (5) affixed to said concave portion (3a) for holding said rolling elements and having slits therein for allowing said rolling elements to contact said upper and lower rail side track surfaces (1b and 1c), rolling elements return passageways (8a and 8b) being formed in the casing in correspondence to said two upper and lower casing side track surfaces (3b and 3c), respectively, the rolling elements return passageways (8a) for said rollers being aligned generally perpendicular to corresponding said upper rail said track surface (1b) so that the angles of the axial centers of said rollers are not changed, and the rolling elements return passageways (8b) for said balls being aligned generally horizontally internal to said casing (3) so said casing is not enlarged by a passageway for said balls having a vertical portion, two upper and lower direction turning passageways (6a and 6b) for the rolling elements (7a and 7b) which roll and run on the two upper and lower casing side track surfaces (3b and 3c) being formed in each of side plates (4), and said side plates (4) being attached to both end portions in the longitudinal direction of the casing, respectively, and thereby coupling the two upper and lower casing side track surfaces with the corresponding return passages, respectively, and thereby forming two upper and lower endless rolling elements circulating passageways.

4. A guide unit according to claim 3, wherein said upper and lower direction turning passageways (6a and 6b) have concave grooves which extend like almost semicircles in the side plates (4) on the extension lines of said casing side track surfaces (3b and 3c), and spacers (9) are fitted into said concave grooves to thereby form the direction turning passageways (6a and 6b) for allowing said rolling elements to smoothly pass.

* * * * *